Sept. 4, 1923.
O. E. OLESON
METHOD AND MEANS FOR JOINING PIPES
Filed Nov. 28, 1919
1,467,064
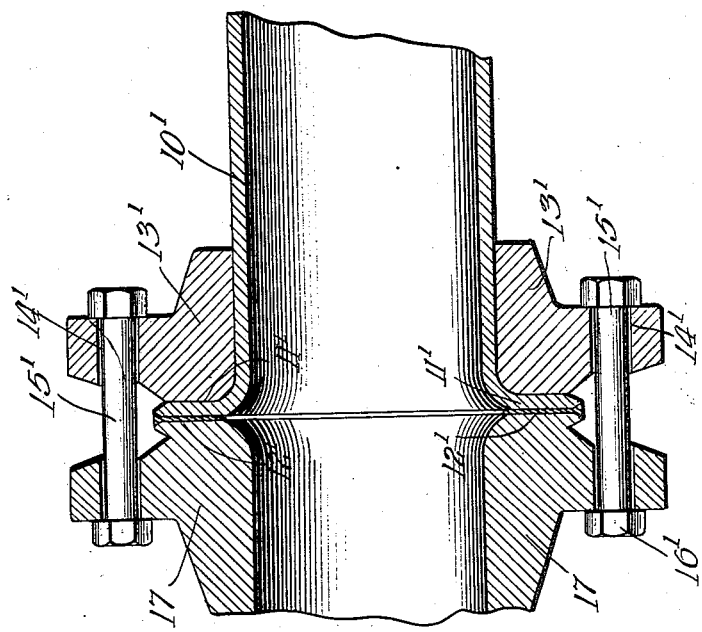
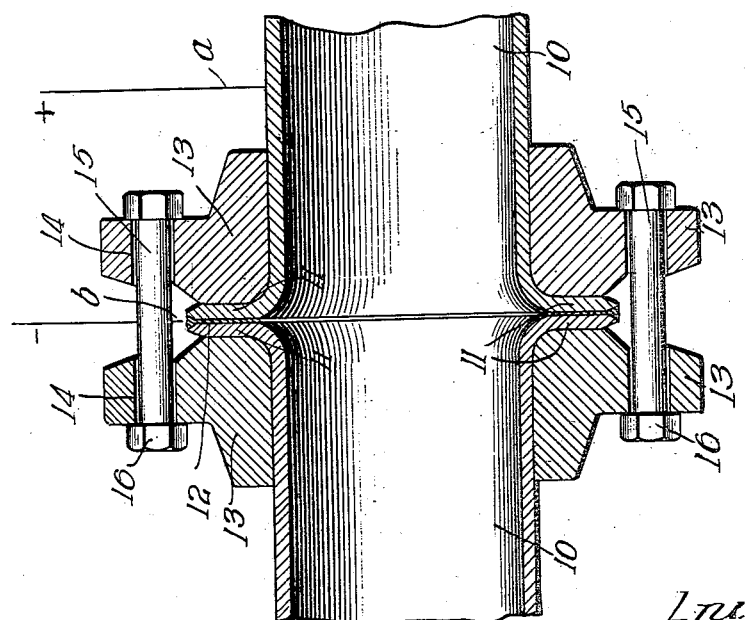
Witnesses:
Harry R. Lee White
W. P. Kilroy
Inventor:
Olaf E. Oleson
By Brown, Boettcher & Steuwer
Attys.

Patented Sept. 4, 1923.

1,467,064

UNITED STATES PATENT OFFICE.

OLAF E. OLESON, OF CHICAGO, ILLINOIS, ASSIGNOR OF ONE-HALF TO CHESTER F. SARGENT, OF WINNETKA, ILLINOIS.

METHOD AND MEANS FOR JOINING PIPES.

Application filed November 28, 1919. Serial No. 341,194.

*To all whom it may concern:*

Be it known that I, OLAF E. OLESON, a citizen of the United States, residing at Chicago, in the county of Cook and State of Illinois, have invented a certain new and useful Improvement in Methods and Means for Joining Pipes, of which the following is a full, clear, concise, and exact description, reference being had to the accompanying drawings, forming a part of this specification.

This invention relates to methods and means for joining pipes and more particularly to improvements upon the type of pipe couplings disclosed in the United States Patent No. 977,226, granted November 29, 1910, and No. 986,506, granted March 14, 1911, to F. Sargent and O. E. Oleson.

In the patents referred to two pipes are permanently secured together end to end and are held against separation by any approved form of clamp, and the joint thus formed between the abutting ends is hermetically sealed by welding. Couplings of this character have many practical advantages. They afford a continuity of the pipes and an absolute seal of the joints, characteristic of welded joints, and at the same time insure exceedingly secure mechanical connections due to the use of the clamps. Furthermore the use of couplings of this character facilitates the taking down of a piping system due to the ease with which the pipes may be separated after the clamps have been disconnected.

The primary aim of the present invention is to improve the type of couplings above outlined by a process and means which will facilitate the sealing of the joints thereof. This is accomplished by positioning a metallic gasket in or around the joint and then by the application of heat, effecting a fusion of the material of the gasket with that of the pipes.

Other objects and advantages will hereinafter appear.

Two applications of the invention are illustrated in the accompanying drawings, in which:—

Figure 1 is a longitudinal section through two pipe ends joined in accordance with the present invention, and Figure 2 is a view similar to Figure 1 showing a modified arrangement.

The ends of the pipes 10, shown in Figure 1, are provided with outwardly extending flanges 11. These flanges form appropriate bearing surfaces for the abutting pipe ends and also constitute appropriate means for receiving the binding pressure of the mechanical clamp. A metallic gasket 12 is inserted preferably between the flanges 11. This gasket may be made of any desired material such as copper, steel, iron or monel or other alloy.

The clamp may be of any approved type. In the present instance it comprises a pair of clamping rings 13 having registering openings 14 for the reception of bolts 15. The rings 13 may be formed as integral parts of the pipes or, as shown in Figure 1, they may constitute separate elements loosely mounted upon the pipes and engageable with the exposed surfaces of the flanges 11. In either event when the nuts 16 on the bolts 15 are screwed home, the abutting flanges are pressed firmly against the interposed gasket 12 and the pipes are rigidly and securely held against separation. Thus it will be seen that the entire mechanical strain is taken up by the clamp.

In order to obtain a tight seal of the joint between the flanges a hot flame is preferably applied thereto and to the gasket 12 to cause a fusion between the gasket and flanges. This may be accomplished in various ways, such as, by the use of an oxy-acetylene flame or by an electric arc. This latter method may be carried out by attaching one terminal of a high-tension circuit to one of the pipes, as indicated at $a$, and drawing an arc from the edge of the abutting flanges, with the other terminal of the circuit, as indicated at $b$. This will secure the desired fusion in an advantageous manner, since the flame can well be confined to just those parts which it is desired to affect.

Figure 2 illustrates another embodiment of the invention especially adapted for use in joining an end of a pipe with a desired casting. In this instance the pipe 10' is provided with a flange 11' for cooperation with the abutting end of a casting 17 in a manner similar to that above described. A metallic gasket is interposed between these parts and the parts are firmly pressed together by means of a clamp similar to that just described. In this instance however one of the clamp rings 18 is formed as an integral part of the casting while the co-operating ring 13' is loosely mounted on the pipe 10'. Bolts 15' pass through the rings 18 and 13' so that when the bolts are tightened, the flange 11' and the abutting end of the casting 17 are firmly pressed against the gasket and the parts are rigidly and securely held in assembled relation. The flame is then applied to the joint in the manner previously described and the joint is hermetically sealed. It is contemplated that this form of the invention may be employed where one of the members is an elbow, coupling, or other similar device.

The joints above described may be easily separated by first disconnecting the mechanical clamp and then placing a cold-chisel adjacent the joint and giving the chisel a sharp blow.

As clearly shown in the drawings, the clamping members are a fairly snug fit in the corners where the flanges join the cylindrical portion of the pipes, or at least they extend into these corners far enough so that an annular contact ring of appreciable area removed from the welding zone is obtained. In forming the joints, the bolts are first tightened and the welding is performed subsequently. Before welding, the compression stress in the gaskets, resulting from tightening the bolts will be distributed substantially uniformly, or, in case the rigidity of the clamping ring permits appreciable distortion when the bolts are tightened, the outer edge of the gasket will carry a heavier load than the inner edge. The welding process raises the temperature of substantially the outer third of the gasket high enough so that the yield point is passed and a readjustment of the internal stresses take place. This shifts the compression load imposed by the tension in the bolts toward the inner edge of the gasket, which is desirable for two reasons; first, it locates the forces that will resist mechanical strain imposed in service nearer in line with the shell of the pipe; and second, it concentrates the sealing action near the inner edge of the gasket. A gasket of such area that the bolts employed could not ordinarily load it sufficiently to eliminate surface irregularities and produce a tight seal may thus be employed, and after welding is completed, the inner portions of the gasket will be jammed tight enough to secure the desired seal. After the welded parts have cooled, thermal contraction of the flanges and the gaskets near their outer edges will produce a slight additional shift of the mechanical stresses. In spite of the exposure of the outer edges to the air, they will be the last parts of the weld to cool because the weld is formed quickly and cooling begins when the large mass of metal back of the weld is still cold, and the conductivity of the metal will carry away the heat even faster than the air. The final cooling of the outer edges may, therefore, put the outer edge under slight tension, thus adding to the total of the forces holding the joints together. In addition to the readjustment resulting from temperature changes at various radial distances from the center during welding, there is a progressive contracting action which follows the welding process circumferentially around the joints. This is believed to be due to the fact that at the point of welding the materials are under no mechanical stress, but as soon as they cool to a temperature where the tensile strength is material, the contraction due to subsequent cooling tends to produce a positive movement of the parts toward each other.

Various changes may be made in the embodiments of the invention hereinabove specifically described without departing from or sacrificing any of the advantages of the invention as defined in the following claims.

I claim:

1. The process of coupling pipes which consists in flanging the abutting ends thereof, then permanently mechanically clamping said ends together with a gasket therebetween, and then welding said ends and said gasket together at the outer edges only to seal the joint.

2. The process of coupling pipes which consists in flanging the abutting ends thereof, then permanently mechanically connecting said ends together with a metallic gasket therebetween, and then concentrating heat upon the edges only of said ends and said gasket, to weld said edges together to seal the joint.

3. The process of coupling pipes which consists in permanently mechanically connecting the abutting ends of the pipes together with a metallic gasket therebetween, and then welding the outer edges only of said ends and said gasket together to form a hermetic seal.

4. The method of joining pipes which consists in flanging adjacent ends of the pipes to provide substantially flat radial bearing surfaces, then mechanically clamping said ends together with a flat metallic gasket between them to form a gasket seal joint, then concentrating heat upon the outer edges only of the gasket and the adjacent edges only of the pipe flanges to fuse the metal of the edges of the gasket and of the flanges to form a hermetic seal at said outer edges only.

5. In a device of the character described the combination of a pair of pipes arranged end to end, a metallic gasket interposed between and forming a mechanical union between said ends to seal the joint, and means for permanently mechanically clamping said parts together to prevent separation of said joint, the edges only of said gasket being fused to the adjacent edges of the pipes.

6. A pipe joint having a gasket, the inner portions of the gasket being under mechanical compression, and the outer edge being fused to the adjacent pipe portions.

In witness whereof I hereunto subscribe my name this 26 day of November, 1919.

OLAF E. OLESON.